3,070,619
PRODUCTION OF 2-MERCAPTO-2-THIONO-DERIVATIVES OF HETEROCYCLIC PHOSPHORUS-CONTAINING COMPOUNDS
William M. Lanham, Charleston, W. Va., assignor to Union Carbide Corporation, a corporation of New York
No Drawing. Filed Oct. 19, 1953, Ser. No. 387,064
12 Claims. (Cl. 260—461)

This invention relates to the preparation of novel compounds of phosphorus having phosphorus in a five-membered or a six-membered heterocyclic ring, and having a thiono group and a mercapto group directly connected with phosphorus, and to a novel process for the production thereof by reacting phosphorus pentasulfide with an alkane-1,2-diol such as ethylene glycol, propane-1,2-diol, butane-1,2-diol and pentane-2,3-diol; or with an alkene-1,3-diol such as propane-1,3-diol, butane-1,3-diol, pentane-2,4-diol or hexane-1,3-diol, as hereinafter described.

The invention has special utility for the production of a novel class of 2-mercapto-2-thiono-1,3,2-dioxaphospholanes and 2-mercapto-2-thiono-1,3,2-dioxaphosphorinanes having structures designated by the formula:

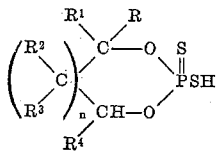

wherein R, $R^1$, $R^2$, $R^3$ and $R^4$, respectively, designate hydrogen or an alkyl group; and $n$ is 0 or 1.

The novel phosphorus-containing compounds of the invention are useful intermediates for the production of various new compounds by reaction with aldehydes, ethylenically unsaturated carboxylic acids and esters, amines, epoxides, etc. They have potential utility as promoters in the flotation of sulfide ores, and as oil additives.

In the practice of the invention, according to a preferred modification thereof, phosphorus pentasulfide is added in small successive amounts to the alkanediol, desirably in the presence of an inert solvent for the diol and the reaction products, while maintaining the reaction mixture at a temperature within the range from 25° C. to 100° C., and above. However, at the higher temperatures side reactions yielding the condensed pyro type of compounds become increasingly active.

While it is preferred to employ stoichiometric proportions of the reactants, this is not essential, and an excess of either reactant can be used, since the order of addition of the reactants does not appear to be critical.

Among solvents for the diols found useful in the process may be mentioned the liquid benzenoid hydrocarbons, such as benzene, toluene, ethylbenzene, and the xylenes.

The principal reaction evidently proceeds according to the equation:

$2[HOCRR^1[CR^2R^3]_nCHR^4OH] + P_2S_5 \longrightarrow$

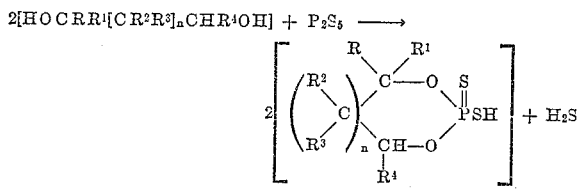

wherein R, $R^1$, $R^2$, $R^3$, $R^4$ and $n$ have the meanings hereinbefore indicated. The hydrogen sulfide gas is removed from the reaction mixture as it is formed in the process. The reaction is complete when evolution of hydrogen sulfide ceases.

The residual reaction products are filtered, and the desired product can be recovered in purified form in various manners. Thus the reaction mixture can be treated with a dilute aqueous solution of a caustic alkali to convert the mercapto compound to the corresponding alkali metal salt, followed by a treatment of the resultant solution with a dilute aqueous solution of a mineral acid such as hydrochloric acid, sulfuric acid or phosphoric acid, to regenerate the mercapto compound, whereupon the solution stratifies to form an oily layer and an aqueous layer. The oily layer then is separated, washed with water, and stripped by distillation under vacuum, and the residue is distilled under high vacuum, preferably using a falling-film molecular-type still.

If desired the filtered reaction product can be purified by crystallization thereof from toluene solution, followed by the extraction of some colored impurities using ethyl ether. The effectiveness of this purification procedure depends of course upon the freezing point and solubility of the product being purified.

The following examples will serve to illustrate the invention:

EXAMPLE 1

To 146 grams (1 mol) of 2-ethyl-1,3-hexanediol held at 90° to 100° C., there were slowly added in successive amounts during 40 minutes 111 grams (.5 mol) of phosphorus pentasulfide. After holding the reaction mixture at 100° C. for 30 minutes longer, until evolution of hydrogen sulfide had ceased, it was filtered. To the agitated filtrate were added dropwise with cooling 220 grams of a 20% aqueous sodium hydroxide solution while maintaining the mixture at 65°–70° C. Thereafter 120 cc. of 37% aqueous hydrochloric acid solution were added dropwise to the resultant homogeneous solution held at 50° C. in a still kettle. The oil layer which formed was separated, washed with 50 cc. of water, and stripped by distillation to a kettle temperature of 100° C. under a pressure of less than 2 mm. of mercury. The residue product was filtered, and further purified by distillation at 124° C. under a pressure of less than 0.2 mm. of mercury using a falling-film type still, yielding 112 grams of 5-ethyl-2-mercapto-4-propyl-2-thiono-1,3,2-dioxaphosphorinane having a refractive index at 30° C. of 1.5341; a molecular weight of 242.4 (theory=240.3); and a purity of 98.7% (by acidity determination). This product contained 12.99% of phosphorus (theory=12.88%) and 25.75% of sulphur (theory=26.68%).

EXAMPLE 2

To an agitated suspension of 111 grams (0.5 mol) of phosphorus pentasulfide in 100 grams of toluene held at 95°–100° C., there were added dropwise during 15 minutes 68 grams (0.9 mol) of propylene glycol. After maintaining the reaction mixture for an additional hour at that temperature to complete evolution of gas, the mixture was filtered, 15 grams of residue being obtained. The filtrate was stripped by distillation to a kettle temperature of 100° C. under a pressure of less than 3 mm. of mercury. Thereafter, the liquid residue was distilled at 100° C. under a pressure of less than 0.2 mm. of mercury; yielding 2-mercapto-4-methyl-2-thiono-1,3,2-dioxaphospholane as a slightly yellowish fluid distillate having a molecular weight of 182.3; $n_D^{30}=1.5592$, percent P=18.62 (theory=18.20); percent S=34.6 (theory=37.67).

EXAMPLE 3

To an agitated suspension of 111 grams (0.5 mol) of phosphorus pentasulfide in 100 grams of toluene maintained at 25°–30° C., there were added dropwise during 7 hours 118 grams (1 mol) of 2-methyl-2,4-pentanediol. After maintaining the reaction mixture at 25° C. for 12 additional hours, evolution of hydrogen sulfide had ceased. The reaction mixture was filtered, and to the filtrate was added a solution of 44 grams of sodium hydroxide in 300 grams of water, while maintaining the mixture at 25°–30° C. Upon stopping agitation, the liquid separated into an aqueous layer and an oil layer. The aqueous layer was acidified with 200 cc. of 37% hydrochloric acid, thereby separating it into a second aqueous layer and a second oil layer. The second oil layer was separated, dried at 25° C. under 3 mm. of mercury pressure, and dissolved in 200 cc. of ethyl ether. This solution was filtered, the filtrate stirred for 4 hours at 25° C. with 150 grams of anhydrous sodium sulphate, allowed to stand overnight at 25° C. and filtered. The filtrate was stripped by distillation at 25° C. under a pressure of less than 2 mm. of mercury. The residue of 2-mercapto - 2 - thiono - 4,4,6 - trimethyl - 1,3,2 - dioxaphosphorinane was secured in the form of a tan solid having the following structure, and having a melting point of 42°–44° C.; a purity of 98.5% (by acidity determination); and the following analysis:

*Analysis, Percent by Weight*

|   | Secured | Theory |
|---|---|---|
| P | 14.61 | 14.58 |
| S | 28.9 | 30.2 |
| C | 33.73 | 33.96 |
| H | 6.11 | 6.17 |

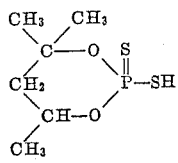

EXAMPLE 4

To an agitated suspension of 111 grams (0.5 mol) of phosphorus pentasulfide in 100 grams of toluene maintained at temperatures of 80°–90° C., there were added during 0.5 hr. 132 grams (1 mol) of 2,2-diethyl-1,3-propanediol and 150 grams of toluene. After agitation of the reaction mixture for an additional 2 hours at such temperature, hydrogen sulfide evolution ceased, and the reaction mixture was filtered at 80° C., the filtrate diluted with 200 cc. of toluene, and the resultant solution was cooled to −15° C., and filtered to recover the crystallized product. The latter was mixed with 2000 cc. of ethyl ether to extract certain colored impurities, and the ether suspension was cooled to −20° and filtered. The solid residue then was stripped by pot distillation to a kettle temperature of 25° C. under a pressure of 2 mm. of mercury, yielding as residue product 5,5-diethyl-2-mercapto-2-thiono-1,3,2-dioxaphosphorinane as a white solid having a melting point of 99°; 101° C., a phosphorus content of 14.02% (theory=13.68%), and a sulphur content of 27.9% (theory=28.32%).

The invention is susceptible of modification within the scope of the appended claims.

I claim:

1. As new products, heterocyclic phosphorus- and sulfur-containing compounds having structures corresponding to the formula:

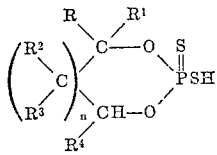

wherein R, $R^1$, $R^2$, $R^3$ and $R^4$, respectively, designates a member of the class consisting of hydrogen and the alkyl groups; and $n$ is a number selected from the class consisting of 0 and 1.

2. As a new compound, 5-ethyl-2-mercapto-4-propyl-2-thiono-1,3,2-dioxaphosphorinane.

3. As a new compound, 2-mercapto-4-methyl-2-thiono-1,3,2-dioxaphospholane.

4. As a new compound, 2-mercapto-2-thiono-4,4,6-trimethyl-1,3,2-dioxophosphorinane.

5. As a new compound, 5,5-diethyl-2-mercapto-2-thiono-1,3,2-dioxaphosphorinane.

6. Process for producing 2-mercapto-2-thiono-derivatives of heterocyclic phosphorus-containing compounds, which comprises reacting phosphorus pentasulfide with an alkanediol of the class consisting of the alkane-1,2-diols and alkane-1,3-diols, and eliminating the by-product hydrogen sulfide as it is formed.

7. Process for producing 2-mercapto-2-thiono-derivatives of heterocyclic phosphorus-containing compounds, which comprises reacting phosphorus pentasulfide with an alkanediol of the class consisting of the alkane-1,2-diols and alkane-1,3-diols, at temperatures within the range between about 25° C. and about 100° C., while eliminating the by-product hydrogen sulfide as formed.

8. Process for producing 2-mercapto-2-thiono-derivatives of heterocyclic phosphorus-containing compounds, which comprises reacting phosphorus pentasulfide with an alkanediol of the class consisting of the alkane-1,2-diols and alkane-1,3-diols, at temperatures within the range between about 25° C. and about 100° C., while eliminating the by-product hydrogen sulfide as formed and recovering from the resultant reaction mixture a compound of the general formula:

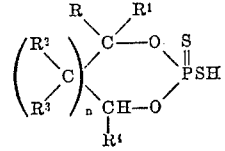

wherein R, $R^1$, $R^2$, $R^3$ and $R^4$, respectively, is selected from the class consisting of hydrogen and the alkyl radicals, and $n$ is a number selected from the class consisting of 0 and 1.

9. As new products, heterocyclic phosphorus- and sulfur-containing compounds having structures corresponding to the formula:

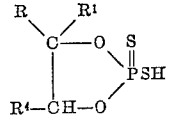

wherein R, $R^1$ and $R^4$, respectively, designates a member of the class consisting of hydrogen and the alkyl groups.

10. As new products, heterocyclic phosphorus- and sulfur-containing compounds having structures corresponding to the formula:

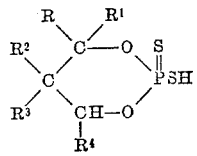

wherein R, $R^1$ $R^2$, $R^3$ and $R^4$, respectively, designates a member of the class consisting of hydrogen and the alkyl groups.

11. As new compounds, 2-mercapto-2-thiono-1,3,2-dioxaphospholanes having at least one alkyl radical attached to at least one carbon atom of the dioxaphospholane ring, the remaining valances of the ring carbon atoms being satisfied by hydrogen atoms attached thereto.

12. As new compounds, 2-mercapto-2-thiono-1,3,2-dioxaphosphorinanes having at least one alkyl radical attached to at least one cabon atom of the dioxaphosphorinane ring, the remaining valances of the ring carbon atoms being satisfied by hydrogen atoms attached thereto.

(References on following page)

References Cited in the file of this patent

UNITED STATES PATENTS

| | | |
|---|---|---|
| 2,355,106 | Prutton | Aug. 8, 1944 |
| 2,529,303 | McDermott | Nov. 7, 1950 |
| 2,552,570 | McNab et al. | May 15, 1951 |
| 2,661,365 | Gamrath et al. | Dec. 1, 1953 |
| 2,661,366 | Gamrath et al. | Dec. 1, 1953 |

OTHER REFERENCES

Arbuzov et al.: Chemical Abstracts, vol. 42 (1948), pages 4932–4934.